United States Patent [19]

Willis et al.

[11] Patent Number: 5,568,571
[45] Date of Patent: Oct. 22, 1996

[54] IMAGE ENHANCEMENT SYSTEM

[75] Inventors: Donald F. Willis, Saline; John E. Brooks, Ypsilanti, both of Mich.; Hosni Adra, Toledo, Ohio; Hsieh S. Hou, Rancho Palos Verdes, Calif.

[73] Assignee: University Microfilms, Inc., Ann Arbor, Mich.

[21] Appl. No.: 989,820

[22] Filed: Dec. 14, 1992

[51] Int. Cl.$^6$ .................................................. G06K 9/38
[52] U.S. Cl. ........................... 382/254; 382/176; 382/271; 358/462
[58] Field of Search ..................... 382/54, 22, 9, 382/50, 51, 271, 173, 176, 266, 296, 254; 358/462

[56] References Cited

U.S. PATENT DOCUMENTS

| | | | |
|---|---|---|---|
| 4,411,015 | 10/1983 | Scherl et al. | 382/51 |
| 4,638,369 | 1/1987 | Hsiem | 382/22 |
| 4,856,075 | 8/1989 | Smith | 382/50 |
| 4,926,490 | 5/1990 | Mano | 382/9 |
| 5,001,767 | 3/1991 | Yoneda | 358/462 |
| 5,038,381 | 8/1991 | Nelson | 382/9 |
| 5,050,222 | 9/1991 | Lee | 358/462 |
| 5,245,445 | 9/1993 | Fujisawa | 358/462 |
| 5,283,667 | 2/1994 | Kojima | 358/462 |
| 5,335,290 | 8/1994 | Cullen et al. | 382/9 |

*Primary Examiner*—Yon J. Couso
*Attorney, Agent, or Firm*—McAndrews, Held & Malloy, Ltd.

[57] ABSTRACT

This specification discloses a process and system for processing a digitally stored image on a digital computer. The system scans and digitizes an image, separate text from non-text components, enhances and deskews the image, compresses the resulting image file, and stores the enhanced, deskewed, and compressed file for later transmission, optical character recognition, or high quality printing or viewing of the image.

26 Claims, 6 Drawing Sheets

Algorithm Flow

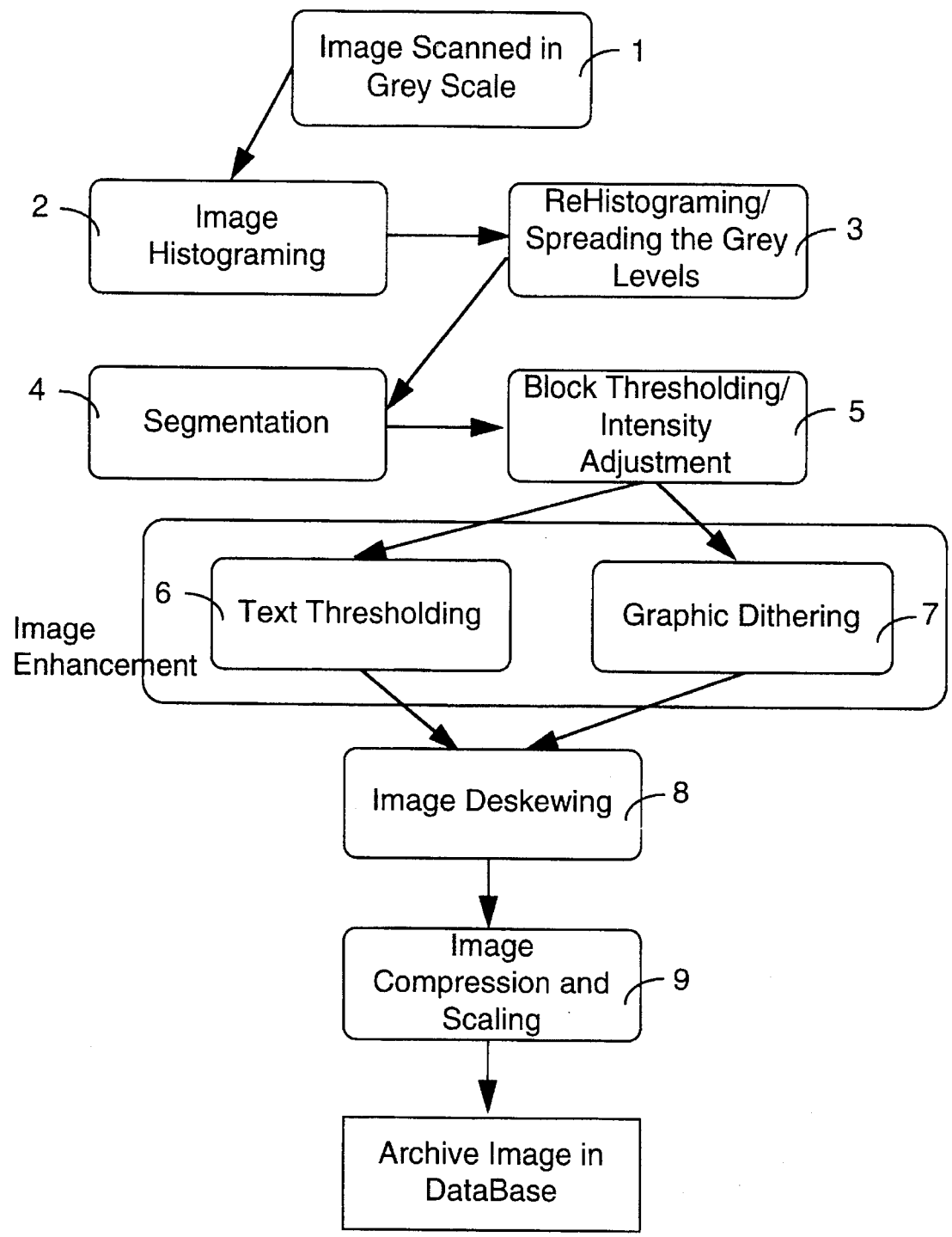
Figure - 1 - Algorithm Flow

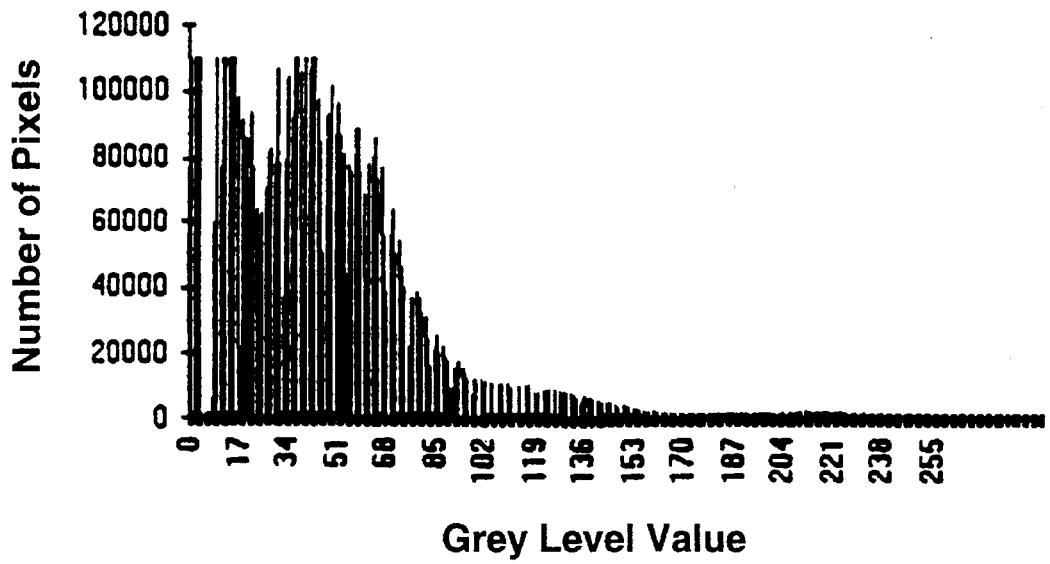
Figure - 2 - Original Histogram
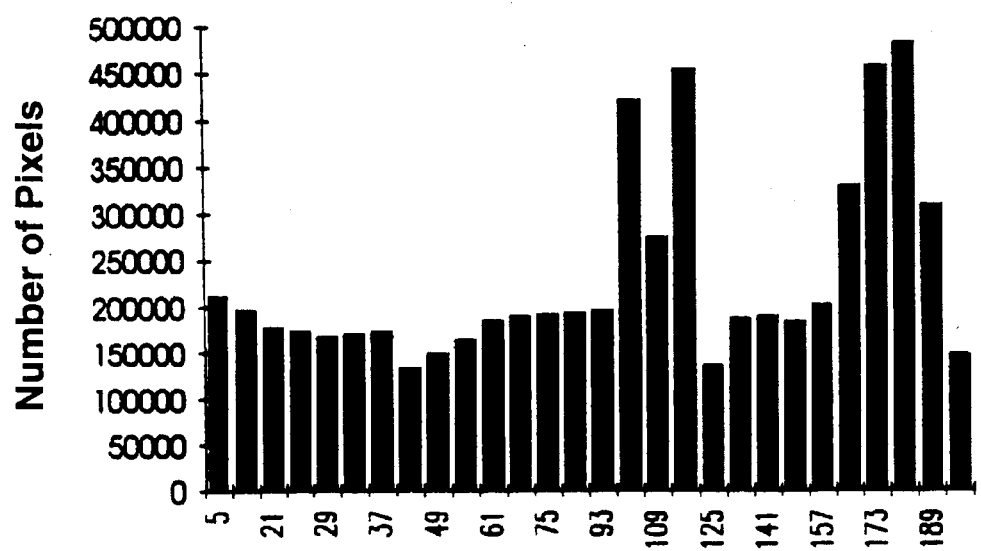
Figure - 3 - Generated Histogram

$$\begin{vmatrix} -1 & -1 & -1 \\ 0 & 0 & 0 \\ 1 & 1 & 1 \end{vmatrix}$$

Horizontal Filter

Figure - 4a - Sample Edge Detection Filter

$$\begin{vmatrix} -2 & 0 & 2 \\ -2 & 0 & 2 \\ -2 & 0 & 2 \end{vmatrix}$$

Vertical Filter

Figure - 4b - Sample Edge Detection Filter

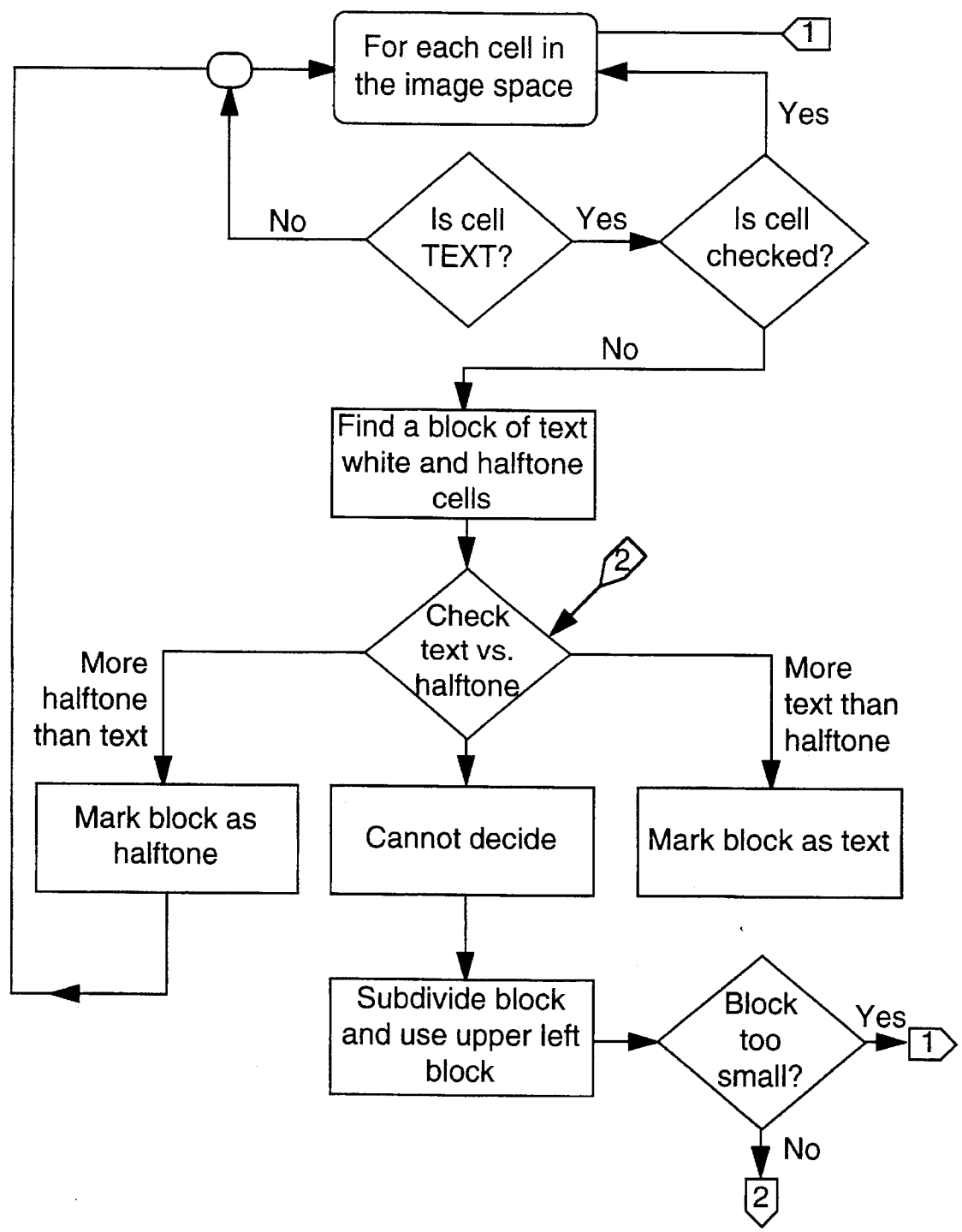
Figure - 5 - Area Subdivision Logic Flow

| 23 | 18 | 4  | 1  | 2  | 10 | 21 | 27 |
|----|----|----|----|----|----|----|----|
| 16 | 12 | 0  | 9  | 5  | 3  | 24 | 14 |
| 11 | 3  | 13 | 17 | 15 | 22 | 0  | 7  |
| 2  | 6  | 19 | 25 | 26 | 20 | 8  | 1  |
| 1  | 10 | 21 | 27 | 23 | 18 | 4  | 2  |
| 5  | 0  | 24 | 14 | 16 | 12 | 3  | 9  |
| 15 | 22 | 3  | 7  | 11 | 0  | 13 | 17 |
| 26 | 20 | 8  | 2  | 1  | 6  | 19 | 25 |

Figure - 6 - 8x8 Dither Matrix

```
    1   2   4   4   2

2   4   8   2   1

4   8  *0   0   0
```

Figure - 7 - Low Pass Filter for Error Diffuse Dither

(* is the position of the current pixel)

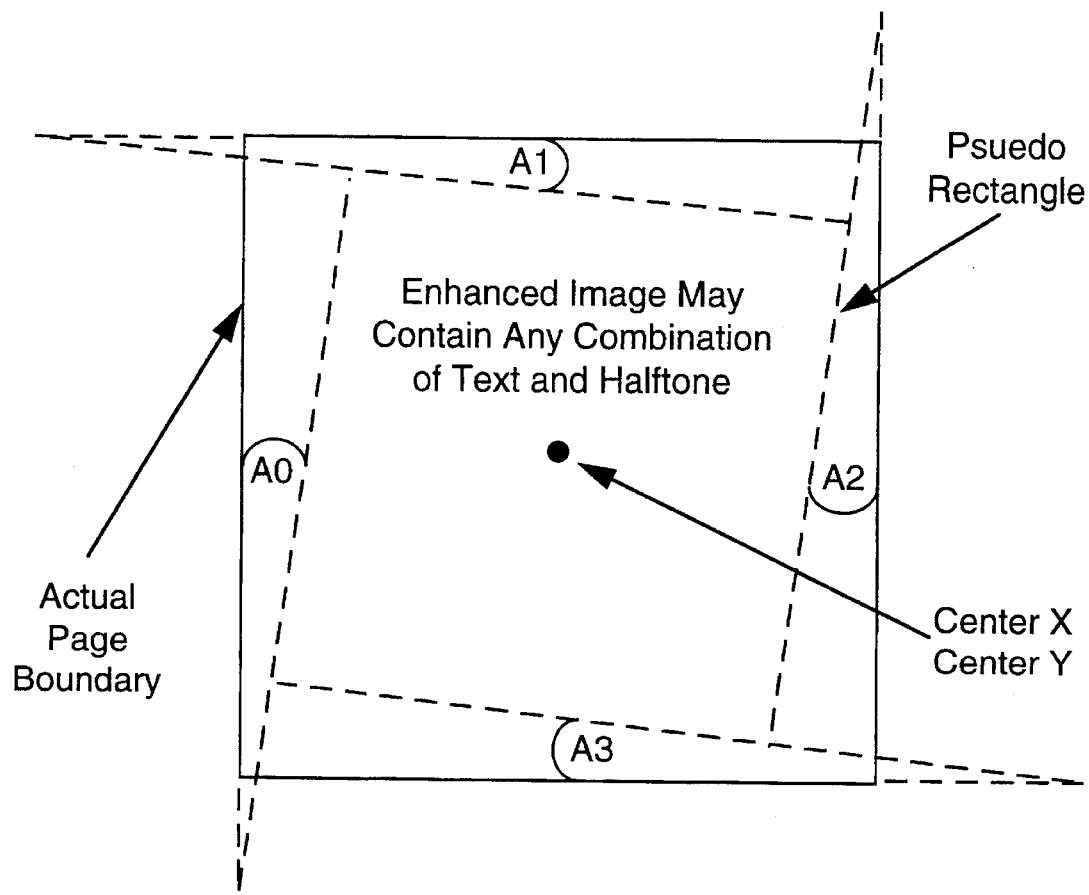
Figure - 8 - Image Centering and Deskewing

IMAGE ENHANCEMENT SYSTEM

FIELD OF THE INVENTION

This invention relates to digital image processing in conjunction with digital computers. Most specifically and preferably, this invention relates to a digital computer apparatus and system for: (i) scanning and digitizing text and non-textual images; (ii) automatically separating the text and non-text segments of the digitized images for purposes of enhancing the differing types of segments; (iii) deskewing the image; (iv) compressing the differing segments (text, continuous tones, halftone, and line art) with one or more compression schemes; (v) storing the resultant compressed image data; and (vi) retrieving the stored image data for decompression, printing or viewing of the image or for other processing of the image data to yield accurate information or a high quality printout or display therefrom. This invention is most preferably useable for enhancing page images and printing or displaying those images, which can be stored in binary format on "CD ROM" media.

BACKGROUND

Wordprocessing on computer systems has become a standard in today's office environment. Rather than typing symbols on a hard page and then working with and editing the hard page, symbols can be typed on and stored in a computer, then easily edited, read or printed out as necessary. Wordprocessing systems have become commonplace not only because they achieve these functions on computer processors that are affordable but also because text can be relatively easily and inexpensively stored and manipulated on personal computer memory storage systems.

Images, as opposed to text, are far more difficult and expensive to store, edit, and process with a computer. Simply stated, a page of image data requires a great deal more memory, storage space, and processing capability than does a comparably sized page of readable text (which is frequently stored in a coded form such as "ASCII").

In this regard, standards have developed for digitizing images to reduce the amount of information required to store, reproduce, or work with them on a computer. Images have been scanned and digitized and stored in black and white, purely binary (digital) representations. In this type of binary digitizing technique, a scanner scans the image and assigns a binary value to each pixel value scanned. Thus, each pixel is assigned a value of 0 or 1 depending on whether the scanner reads the pixel as either white or both non-white and below some threshold darkness value. The result is a "binary image" or bit map of the pixels for the image.

Since the data storage technique in strictly binary, the binary image can be readily and accurately compressed and decompressed with readily available compression techniques, such as CCITT group 4. A problem with this technique, however, is that the binary scan loses all shading information for the pixels. Each pixel is either black or white, which yields relatively poor reproduction of halftone pictures on most commonly available scanners, video screens, and printers, particularly those for use in conjunction with PC's.

Another method for digitizing an image is called "grey scaling." It involves dividing up a picture into pixels (or groups of dots) and then encoding the intensity or shade of the pixel through a numerical scaling scheme. The grey shade is reproduced according to the scaler value associated with the pixel. Similar scaling techniques can also be used to impart color information into image data. While this technique for digitizing can yield quite pleasing reproduction of the image on commonly available computer equipment, it too has several problems.

One such problem is the difficulty of compressing grey-scale data. Since each pixel is represented by a number of bits in a unique arrangement representing a particular grey-scale value, the grey-scale file is larger than a strictly binary, bit map file for the same number of pixels in a given image. The larger file therefore cannot be as quickly compressed as a purely binary file representation of the same image with the same number of pixels, and the resulting compression will be larger because of the significantly larger size of the grey-scale file to begin with.

In all of these digital image techniques, of course, the higher the data sampling rate, the higher the resolution of the image. However, the larger amounts of data resulting from the increased sampling rate require more storage space, faster digital processing power, faster and more accurate scanning and reproduction equipment, etc.

In terms of storage space alone, for example, a typical page (8.5"×11") of text data only, stored in standard "ASCII" coding format, requires about 5,500 bytes of storage space. A typical page of graphic image data, digitized at 300 dots per inch ("DPI") in grey scale at 8 bits per pixel, requires about 8.5 megabytes of storage space. If digitized as a color file rather than a grey scale file, the resulting file is three to four times larger than the grey scale file. Thus, the automation industry has long been confronted with the problem of the amount of storage space, and processing power, required to work with graphic image data on a computer system.

The industry has developed some compression techniques that can reduce the storage space required for such a grey scale file to about 600 kilobytes per page. If, however, the image is scanned and stored as a binary (e.g., black and white) file rather than a grey scale or color scale file, the storage space can be reduced to an average of about 1 megabyte per page. With compression techniques such as the CCITT Group 4 standard, the size of such a binary file can be losslessly reduced by a factor of about 10 to about 100 kilobytes.

While such compression techniques are known in the prior art, the resulting files are still relatively large, requiring relatively larger amounts of file storage space and processing power. Also, as noted above, binary image files required for attaining adequate compression contain inherently less information than grey scale files for the same image and resolution.

In addition, the binary files generated by prior art techniques are not optimal for use in identifying, storing, and processing text components. As a result, optical character recognition is not sufficiently acceptable with the prior art methods to yield recognition patterns that are nearly devoid of errors and suitably reliable for use on the computer system, particularly in the personal computer environment where scanned images are often skewed or include both textual portions and non-textual components or "graphics" (which for purposes of this application is defined to mean non-textual components such as line art, continuous tones, or grey scale or halftone information).

In the past, the industry has generally developed image processing software that requires use of specialized hardware processors and boards. The use of the software is thus inherently limited to systems having such specialized, and usually costly, hardware.

There are a variety of other problems with existing digital image processing techniques. One such problem has been the insufficient processing speeds for scanning, enhancing, and storing the image on, for example, a personal computer system with off-the-shelf components. In this regard, the industry has long been attempting to develop various image enhancement techniques such as high and low pass filters, and image re-histogramming. Low pass filters have helped reduce high frequency noise in the scanned image. High pass filters have been used to detect and enhance edges. The histogram, a graph of the number of pixels in the image for each grey level, has been used to re-allocate the number (and identity) of pixels in available grey levels in order to enhance the image and bring out detail. These techniques have not previously been effectively and efficiently combined, particularly for processing complex page images (including both text and black and white or color graphics) on readily available personal computing equipment.

Another problem with prior art image processing techniques has been lack of sufficient correction of skew in the scanned images. This not only results in an image being viewed or reprinted off-center but also causes unnecessary errors in subsequent operations, such as optical character reading, of the textual portions of the image files.

OBJECTS AND ADVANTAGES

It is therefore an object of the present invention to develop an improved digital image processing apparatus and system.

It is a further object to provide such an apparatus that yields higher quality yet compressed files of image and text data, thus requiring less storage space.

Another object is to provide a digital image processing apparatus that processes graphics separately from the text to maximize reproduction quality of the graphics and text.

A still further object is to provide a digital image processing apparatus and process that preserves and enhances grey scale or color information (preferably by producing pseudo, rescaled grey levels) in addition to clarifying text, preferably without any increase in the amount of data being saved.

Yet another object is to provide such an apparatus that yields a high quality binary image file that can be readily compressed with existing compression schemes.

A further object is to provide a digital image processing system that will correct skew errors which typically occur during scanning and digitizing an image.

Another object is to provide such a binary image file that can be passed to an optical character recognition engine to produce near 100% accuracy in character recognition.

A still further object is to provide a digital image processing system that can run on commonly available personal computing apparatus.

An additional object is to provide a digital image processing system that minimizes processing times by utilizing features such as memory caches, pipelining of system services, CD-ROM storage, and the like. In this regard, the preferred embodiment utilizes parallel processing techniques (such as pipelining) that multiple off-the-shelf processors execute a special imaging function to generate sufficient speed for near real-time image processing with the system.

There are other objects and advantages. They will become apparent as the specification proceeds.

BRIEF DESCRIPTION OF THE DRAWINGS

The preferred embodiment of the present invention is disclosed with reference to the accompanying drawings and flow chart and software appendixes. In the accompanying drawings:

FIG. 1 is an overall flow chart of the digital image processes performed by the preferred digital computing apparatus;

FIG. 2 is a sample original histogram for an image scanned in grey scale by the preferred apparatus;

FIG. 3 is a sample re-generated histogram generated by the preferred digital processing apparatus for the sample scan shown in FIG. 2;

FIG. 4 is the edge detection filter matrix used by the segmentation process shown in FIG. 1;

FIG. 5 is a flow chart of the main aspects of the Segmentation process shown in FIG. 1;

FIG. 6 is the dither matrix used in graphic dithering step shown in FIG. 1;

FIG. 7 is the low pass filter used in the graphic dithering step shown in FIG. 1; and FIG. 8 depicts aspects of the image deskewing step shown in FIG. 1.

DETAILED DESCRIPTION OF THE PREFERRED EMBODIMENT

The preferred embodiment of the present invention utilizes a standard IBM compatible PC as a host system having an Intel 80386, or, more preferably, 80486, CPU. The PC has a large hard drive, preferably with 300 Megabytes of storage space. A standard 300 dot per inch (DPI) or higher grey scale-capable scanner is attached to the PC through a SCSI interface. Also attached to the PC is a Super VGA color monitor and a standard 300 DPI laser printer.

Depending upon the power of the host system, a coprocessor may be required to speed up mathematical enhancement calculations. The preferred coprocessor is the Intel i860 CoProcessor board mounted internally on the standard PC/AT bus in the PC. The i860 chip on the CoProcessor board is controlled or directed by the CPU in the PC as the host system.

The PC performs the preferred image processing functions via software originally written in the C programming language and set forth in the Software Microfiche Appendix accompanying this specification. A set of flow charts for the C source code in the Software Appendix is set forth in the accompanying Flow Chart Appendix.

Referring now to FIG. 1, the preferred image analysis and enhancement process commences by initializing the image memory space and other key parameters used in processing in the computer. Then, an image is scanned in grey scale on the scanner and loaded into RAM memory that is accessible as local memory for a coprocessor.

The process next performs a "histogram" analysis on the image grey scale values. A histogram analysis determines the number of pixels in the image represented by each particular grey scale value contained in the image data. The analysis may be depicted as a graph of the number of pixels (on the ordinate) versus the range of gray level values (on the abscissa). In this manner, the number of pixels for each particular such grey scale value is plotted, as shown in FIG. 2, to generate a frequency distribution curve for the grey scale values in the image. This histogramming analysis is performed in the "histogram( . . . )" subroutines set forth in the attached Appendix.

The histogram curve, FIG. 2, reveals spikes in the curve in which an excessively large number of pixels are represented by relatively few grey scale values (i.e., area of the grey scale spectrum). The histogram data also indicates the highest and lowest grey scale values in the grey scale spectrum for the image. The histogram analysis thus determines the location of density spikes and the high and low grey level values. In this manner, this original histogram analysis defines the universe of grey levels available for redistribution or reallocation by the next "re-histogramming" step.

In the re-histogramming step, the pixels are reallocated among a predetermined number of grey levels. In the preferred embodiment, the number of grey levels is set to 32 because that the human eye generally cannot resolve more than about 30 levels of grey ranging for black to white.

The preferred re-histogramming process selects the 32 grey levels from the original histogram data by: (1) deleting the grey values at about the upper and lower 5% of the original histogram to eliminate noise; (2) assigning two of the grey levels the lightest and darkest grey values respectively; (3) dividing the total number of pixels in the data by 30 to yield 30 sub-groups of pixels; (4) calculating a new grey level average value for each such sub-group; and (5) then re-mapping the image pixels to receive one of the thirty average values thus calculated. The re-mapping step assigns new grey level values so that (1) spiked areas in the original histogram receive the greatest number of grey level average values, and are thus more spread out on the re-histogram curve, and (2) less detailed areas receive fewer numbers of grey level values and are thus condensed on the re-histogram curve. This re-histogramming process brings about greater contrast and more detail in the image.

Finally, because light areas become extremely light and cannot be distinguished when printed, the highest portion of the re-histogram is moved down by two levels to provide more darkness for those pixels. The result is 30 grey level brackets (2 grey levels representing the lightest and darkest boundaries and 28 calculated intermediate values) of re-histogrammed grey scale values stored as a grey scale image in RAM memory. A graph of the resulting re-histogram is shown in FIG. 3.

A more specific statement of this re-histogramming process is as follows:

DEFINITIONS

MinGrey:
the darkest grey scale value in the original histogram data not including black.

MaxGrey:
the lightest grey scale value in the original histogram data not including white.

BottomInterval:
the minimum number of original grey levels that can be transformed into one level during the re-histogramming step; defined to 4 in the preferred embodiment.

TopInterval:
the maximum number of original grey levels that can be transferred into one level during the re-histogramming step; defined to 11 in the preferred embodiment.

PixelSum:
the number of pixels that should be included in one generated grey level without distorting the image spectrum;

NumNewLevels:
the number of grey levels to be generated; defined to be 28 (not including the darkest and lightest levels) in the preferred embodiment.

NG:
is the regenerated set of grey levels mapped in the re-histogramming step (a total of 30 in the preferred embodiment).

$Hist_{0..255}$:
the original number of pixels in a grey level.

Re-histogram Process:
(1) sort the histogram according to the number of pixels per level.
(2) delete from the histogram the upper 5% and bottom 5% of the grey level values in the sorted histogram;
(3) determine the resulting total number of pixels remaining in the sorted histogram and store the resulting number in PixelSum;
(4) determine the number (32 in the preferred embodiment) of new grey levels (NG) and define for all but $NG_0$ and $NG_{NumNewLevels}$ the following subset of pixels:

$NG_{i, i-1 ... NumNewLevels}$ = Average Grey value in
 {original grey values $G_n ... G_k$,
 where $n = NG_{i-1}$,
 $k > NG_{i+BottomInterval}$,
 $Sum(Hist_{NGi ... k}) >= PixelSum$,
 $k < NG_{i+TopInterval}$}

(5) assign the darkest and lightest remaining grey level values to $NG_0$ and $NG_{numNewLevels}$ respectively; and
(6) map the newly generated grey levels (NG) onto the image thru the function:

New Pixel Grey Level=$NG_i$; where $NG_i$ corresponds to the largest NG value that is smaller than the original grey level value for the pixel.

The next step in the process involves the determination of key values that will be used in further image enhancement and processing. This determination proceeds as follows:

Lightest NG=The lightest non-white NG value in the re-histogrammed image.

Darkest NG=The darkest non-black grey level in the re-histogrammed image.

Text Threshold=(Lightest NG−Darkest NG)/2+Darkest NG)

Edge Threshold=Text Threshold * 0.30

After these values are determined, the process seeks to differentiate or segment text from graphics regions in the re-histogrammed image. White areas are also determined and used later to speed up the process. The result is a multi-block segmented structure that identifies areas of text, white space, and graphics areas in the page image. The blocks generated can be of any shape provided that each edge minimally includes eight linearly-aligned pixels at the boundary of an eight-by-eight pixel (i.e., sixty-four pixel) cell.

The sub-steps of this segmentation process are as follows:
1. Each pixel in the image is processed by standard horizontal and vertical edge detection filters, such as shown respectively in FIG. 4, to yield an edge detection value for the pixel. The edge detection value is compared with the Edge Threshold value computed as noted above. If the edge detection value is smaller than the Edge Treshold, the pixel is marked as part of an edge. In the preferred filters of FIG. 4, the numerical differences between the horizontal and vertical filters bias this edge detection step toward location of vertical edges, since text areas normally contain more vertical than horizontal edges.

2. The detected edges are processed by a clean-up and cell tagging step on each eight-by-eight cell in the image. This cleanup and tagging step proceeds as follows for each cell:

A. if the cell contains a connected edge, mark it as text;
B. if a cell contains an edge that extends to the boundaries of the cell, mark it as text;
C. if the cell has a majority of white pixels, mark it as white; and
D. otherwise, mark the cell as a graphics cell.

After these operations are completed for the entire image, text cells may not be contiguous, with graphics or white cells located in-between cells marked as text. In addition, graphics cells can be mistakenly tagged as text. The next step corrects these problems by grouping the cells into blocks and tagging the blocks.

As shown in FIG. 5, this block division and tagging step is as follows:

1. Locate a text cell.
2. Search the cell map vertically and horizontally to locate a block in which each text cell is no more than three cells away from another text cell.
3. using the following process, determine whether all the cells in the block should be tagged as text or graphics:
   A. Define NUMCELLS=Number of cells in the block.
   B. If:
   1. The number of graphics cells>=NUMCELLS * 0.8; or:
   2. both (i) the number of text cells>=NUMCELLS * 0.1, and (ii) the number of white cells=NUMCELLS * 0.2;
   3. Then tag all cells in the bock as containing graphics.
   C. If:
   1. the number of text cells>=NUMCELLS * 0.6; or
   2. both (i) the number of text cells>=NUMCELLS * 0.3, and (ii) the number of white cells>=NUMCELLS * 0.5; or
   3. the number of white cells>=NUMCELLS * 0.7;
   4. then tag the cells in the block as text.
   D. Otherwise:
   1. subdivide the block into nine different regions.
   2. Starting with the upper-left region, repeat the process of steps A through C above, treating the region as a block of cells in the context of those steps.
   3. For any region that cannot be tagged according to the process of steps A through C above, treat the region as a block in the context of steps D(1) and D(2) above, and repeat this subdividing, testing, and tagging procedure until:
      a. all cells in the block are re-tagged; or
      b. the remaining sub-regions of cells that have not yet been re-tagged consist of ten or fewer cells. In this event, do not change the original tagging for these sub-regions.

After the above steps are completed on all pixels in the image, the resulting map consists of different blocks re-tagged as text or graphics. Because, however, some small regions may not be re-tagged in the subdivision processes, these regions must be re-tagged pursuant to a simple neighbor block comparison and then tagged accordingly. The preferred neighborhood block comparison proceeds as follows:

for every untagged region, check all surrounding cell types;

if the surrounding cell types are all text, tag the region as text;

if the surrounding cell types are all graphics, tag the region as graphics;

else if at least 50% of the surrounding cells are graphics, tag the region as graphics;

else mark it as text.

The next step involves block thresholding and intensity adjustment. In this process, the image is preferably subdivided into sixteen-by-sixteen cell blocks. In each such block, Block Text and Graphics Threshold values are computed as follows:

Block Text Threshold = 0.5 * ( Median *NG* value in the block + Text Threshold).

Block Graphics Threshold = ((lightest *NG* − darkest *NG*) * 0.5 + darkest *NG* + Edge Threshold * 2)/3.

Each text block is next threshold tested again to convert the grey level values for the pixels in the block to binary white (0) or binary black (1). One such process is called regular thresholding. In regular thresholding, if the pixel NG value is greater than the Block Text Threshold, then its value is reset to white. Otherwise, the NG value is set to black (1).

Another type of threshold testing useable at this stage is adaptive thresholding. In adaptive thresholding, each text block is again subdivided into cells. A cell threshold is calculated for each cell, which yields more detail in the text area while reducing or eliminating background noise.

The preferred adaptive cell threshold process is as follows:

Adaptive Cell Threshold = ((lightest cell grey scale value − darkest cell grey scale value) * 0.5 + darkest cell grey scale value) * 0.4 + (Adaptive Cell Threshold for cell located above the present cell * 0.2) + (Adaptive Cell Threshold for cell to the left of the present cell * 0.2) + (Block Threshold * 0.2).

This adaptive thresholding process is computationally complex. The preferred program thus performs regular thresholding and also performs this adaptive process if desired.

White regions are, of course, processed to convert all grey scale values within them to binary white (0).

For graphics regions, each such region is passed through a low pass filter to smooth out sharp edges that were introduced during edge detection. The result of the low pass filtration step is then compared to an eight-by-eight dither matrix of threshold values. The post-filtration grey level pixel values larger than or equal to their corresponding dither threshold value are retained. Those that are lower are replaced with the grey scale equivalent for white.

The preferred dither matrix is shown in FIG. 6. It may be replaced with an adaptive dither matrix when the image is particularly complex. In such a dither matrix, the matrix representation is determined by reference to the contents of the cell being dithered and perhaps adjacent cells as well. Use of an adaptive dither matrix is computationally intense, of course, and is thus not generally preferred.

Finally, this stage of the process applies an error diffuse dither to the pixels in the graphics blocks using a low pass filter such as shown in FIG. 7. The numerical difference between the grey scale value for the pixel remaining after the preceding step and the resulting pixel value after error diffuse dithering, is saved and compared to a Block Graphics Threshold value for the block. If that difference is greater than the Block Graphics Threshold value, then the pixel value is reset to binary black (1); otherwise, it is reset to binary white (0).

The resulting dither pattern for the image is not only binary but also highly detailed and pleasing to the human eye. This filter thus accomplishes two functions at the same time: the low pass aspects smooth the image and the thresholding yields a grey level effect but with binary display generation.

The resulting binary text and graphics image may be skewed, or off-center, with respect to the digitizer. This can cause subsequent optical character recognition (OCR) processes to generate errors. Skewing can also cause subsequent compression processes to generate more data (reduced compression).

With reference now to FIG. 8, the preferred process corrects these problems by deskewing the images on a pixel-by-pixel basis. The process is as follows:

1. Trace the boundary of the generated image to generate a pseudo-rectangle for all the image data.
2. Compute the widest points of the generated rectangle and use them to locate the image position with respect to the actual physical paper boundaries.
3. Compute translation parameters (CenterX, CenterY) required to center the four corners of the image.
4. Use the boundary thus determined to find the largest straight line possible on each of the four sides of the rectangle.
5. Compute four angles (A0 ... A3) to define the skew of the four sides from optimal horizontal and vertical alignment.
6. Compute the skew (Alpha) as the median of the four angles (A0 ... A3).
7. Apply a two-dimensional rotation (by Alpha) and translation (by CenterX, and CenterY) on the enhanced image.

The result of this rotation will not be distorted since the rotation changes only the image orientation. In addition, the process will determine when unacceptable scanning errors have occurred if rotated pixels are outside the page boundary. When such an event occurs, the process will so indicate to the user, requiring re-scanning of the image to reduce or eliminate skewing. The process thus delivers a deskewed and enhanced image file that, when presented to an OCR engine, yields significantly greater character recognition accuracy than avialable from prior art systems.

The final stage of the preferred process is the compression step. Preferably, the enhanced and deskewed binary image is losslessly compressed using the CCITT Group 4 compression standard with the extension 7 mode. Extension 7 reduces the possible negative compression that the error diffuse dither may yield through original Group 4 compression without that extension mode.

The compressed images can thus be readily stored or losslessly decompressed and displayed on screen or printed. When printed on a standard 300 dpi printer, the printed image has remarkable enhanced integrity and detail when compared with the original image. It is also quite pleasing to the human eye—generally as pleasing as traditional gray-scale image files (which are about ten times larger in size) when processed on similar equipment with traditional grey-scale scanning, storing, and displaying techniques on the same type of equipment. The preferred method also provides text segments that are processable with commonly available OCR software (such as Omnipage, Perceive, or 0cram) at near 100% accuracy.

In the preferred embodiment, control software schedules the processing functions of the attached scanner, the internal CPU in the host computer, and the i860 on the CoProcessor board. The host computer runs the control software, which in turn invokes and initializes the image enhancer processing on the CoProcessor. In addition, the host initializes the scanner.

Upon initialization, the control software initiates a pipeline on the entire system, as shown in FIG. 9. The pipeline is established to simultaneously:

1. scan an image on the scanner;
2. process and enhance a previously scanned image; and
3. save and update a database, or print or display images.

In the preferred system, the process does not rely heavily on operating system input or output (I/O). Instead, I/O operates completely out of system memory (RAM), eliminating a main source of I/O bottleneck.

Also, the preferred system utilizes both then internal RAM cache on the i860 and the external RAM cache on the CoProcessor board. It is believed that, when the preferred process is loaded and running, the majority of the software object code resides on the external cache, so that the code hit rate approaches 99%. In addition, it is believed that at least one scanline of pixels is loaded into the internal cache at any one time. This greatly reduces pixel access and processing time.

The only real bottleneck in the preferred system is due to physical limitations of the PC/AT (or, alternately, EISA) bus during image transfer. The preferred system's pipelining techniques, internal and external caching, and system memory I/O control thus greatly reduces processing time within the confines of restrictions imposed by the bus.

The foregoing description is a detailed description of the preferred embodiment. The scope of the invention is determined, however, by reference to the following claims.

We claim:

1. A digital image processing apparatus comprising in combination;

A. means for receiving a scaler image file of scaled pixel values;

B. means for segmentation of the scaled pixel values into graphics blocks and non-graphics blocks, the segmentation means including:
   1. means for determining at least a first edge threshold from the scaled pixel values wherein the edge threshold is determined according to the following formula:

$TV = a \times ((LNG - DNG)/b + DNG)$;

where:
   a and b are numerical coefficients;
   TV=edge threshold;
   LNG=lightest non-white scalar pixel value; and
   DNG=darkest non-black scalar pixel value; and
   2. means for applying at least one edge detection filter to each scalar pixel value and tagging as an edge the scalar pixel values satisfying the conditions of the edge detection filter;

C. means for developing a binary image file derived from the scalar image file, the developing means including:
   1. means for applying a text threshold to the non-graphics blocks in the scalar image file to convert each scaled pixel non-graphic value into a first binary value representing text or alternatively a second binary value representing background for the text; and 2. means for applying a graphics threshold to graphics blocks in the scalar image file to convert each scaled pixel graphic value into a first binary value representing one color or alternatively a second binary value representing another color; and D. means for compressing the binary image file to yield a compressed image file for subsequent decompression and digital processing of the compressed image file.

2. The digital image processing apparatus of claim 1 wherein the segmentation means also includes block division and tagging means having:

(i) means for locating blocks of cells within a predetermined proximity to one another whose contents have been tagged as text;

(ii) means for analyzing cells in the block and re-tagging them as text or graphics; and (iii) means for comparing any remaining cells, not previously allocated to blocks, to adjacent cells to re-tag the remaining cells as text or graphics.

3. The digital image processing apparatus of claim 2 also including a compressor whereby the binary image file is compressed to yield a compressed image file for subsequent decompression and digital processing of the compressed image file and wherein the compressor implements the CCITT Group 3 or 4 standard.

4. The digital image processing apparatus of claim 3 also including means for deskewing the image.

5. The digital image processing apparatus of claim 4 also including:

(i) means for filtration of the text blocks to clarify the textual components represented by the text blocks; and (ii) means for filtration of the graphics blocks to enhance the graphics components represented by the graphics blocks.

6. The digital image processing apparatus of claim 1 also including means for deskewing the image.

7. The digital image processing apparatus of claim 6 wherein the deskewing means includes:

A. means for tracing the image file to locate a rectangle boundary for the image file;

B. means for computing the widest points of the rectangle boundary;

C. means for determining a center for centering the four corners of the image file;

D. means for locating the longest straight line on at least one side of the rectangle boundary;

E. means for computation of the skew angle for at least the one side from optimal horizontal or vertical alignment about the center; and F. means for applying a two-dimensional rotation of the rectangle boundary about the center through the skew angle.

8. A digital image processing apparatus comprising in combination:

A. means for receiving a scaler image file of scaled pixel value;

B. means for segmentation of the scaled pixel values into graphics blocks and non-graphics blocks, the segmentation means including:

1. means for determining at least a first edge threshold from the scaled pixel values wherein the edge threshold is determined according to the following formula:

$$TV = a \times ((LNG - DNG)/b + DNG);$$

where:

a and b are numerical coefficients;

TV=edge threshold;

LNG=lightest non-white scalar pixel value; and

DNG=darkest non-black scalar pixel value; and 2. means for applying at least one edge detection filter to each scalar pixel value and tagging as an edge the scalar pixel values satisfying the conditions of the edge detection filter;

C. means for developing a binary image file derived from the scalar image file, the developing means including:

1. means for applying a text threshold to the non-graphics blocks in the scalar image file to convert each scaled pixel non-graphic value into a first binary value representing text or alternatively a second binary value representing background for the text; the applying means includes a vertical edge detection filter and a horizontal edge detection filter with the vertical edge detection filter emphasized in comparison to the horizontal edge detection filter so that the applying means is more likely to locate a vertical edge than a horizontal edge; and 2. means for applying a graphics threshold to graphics blocks in the scalar image file to convert each scaled pixel graphic value into a first binary value representing one color or alternatively a second binary value representing another color; and D. means for compressing the binary image file to yield a compressed image file for subsequent decompression and digital processing of the compressed image file.

9. The digital image processing apparatus of claim 8 also including:

(i) means for filtration of the text blocks to clarify the textual components represented by the text blocks; and (ii) means for filtration of the graphics blocks to enhance the graphics components represented by the graphics blocks.

10. The digital image processing apparatus of claim 8 also including a compressor whereby the binary image file is compressed to yield a compressed image file for subsequent decompression and digital processing of the compressed image file and wherein the compressor implements the CCITT Group 3 or 4 standard.

11. The digital image processing apparatus of claim 8 also including means for deskewing the image.

12. The digital image processing apparatus of claim 11 wherein the deskewing means includes:

A. means for tracing the image file to locate a rectangle boundary for the image file;

B. means for computing the widest points of the rectangle boundary;

C. means for determining a center for centering the four corners of the image file;

D. means for locating the longest straight line on at least one side of the rectangle boundary;

E. means for computation of the skew angle for at least the one side from optimal horizontal or vertical alignment about the center; and F. means for applying a two-dimensional rotation of the rectangle boundary about the center through the skew angle.

13. A digital image processing apparatus comprising in combination:

A. means for receiving a scaler image file of scaled pixel values;

B. means for segmentation of the scaled pixel values into graphics blocks and non-graphics blocks, the segmentation means including:
1. means for determining at least a first edge threshold from the scaled pixel values wherein the edge threshold is determined according to the following formula:

$$TV=a\times((LNG-DNG)/b+DNG);$$

where:
a and b are numerical coefficients;
TV=edge threshold;
LNG=lightest non-white scalar pixel value; and
DNG=darkest non-black scalar pixel value;
2. means for applying at least one edge detection filter to each scalar pixel value and tagging as an edge the scalar pixel values satisfying the conditions of the edge detection filter; and
3. means for grouping adjacent scalar pixel values into a cell and re-tagging the scalar pixel values in the cell as:
(a) text if the cell contains outer connected edge of adjacent scalar pixel values or an edge of scalar pixel values extending to the boundaries of the cell;
(b) background if the cell contains a majority of non-edge scalar pixel values; and
(c) graphics otherwise;
C. means for developing a binary image file derived from the scalar image file, the developing means including:
1. means for applying a text threshold to the non-graphics blocks in the scalar image file to convert each scaled pixel non-graphic value into a first binary value representing text or alternatively a second binary value representing background for the text; and
2. means for applying a graphics threshold to graphics blocks in the scalar image file to convert each scaled pixel graphic value into a first binary value representing one color or alternatively a second binary value representing another color; and
D. means for compressing the binary image file to yield a compressed image file for subsequent decompression and digital processing of the compressed image file.

14. The digital image processing apparatus of claim 13 also including:
(i) means for filtration of the text blocks to clarify the textual components represented by the text blocks; and
(ii) means for filtration of the graphics blocks to enhance the graphics components represented by the graphics blocks.

15. The digital image processing apparatus of claim 13 also including a compressor whereby the binary image file is compressed to yield a compressed image file for subsequent decompression and digital processing of the compressed image file and wherein the compressor implements the CCITT Group 3 or 4 standard.

16. The digital image processing apparatus of claim 13 also including means for deskewing the image.

17. The digital image processing apparatus of claim 16 wherein the deskewing means includes:
A. means for tracing the image file to locate a rectangle boundary for the image file;
B. means for computing the widest points of the rectangle boundary;
C. means for determining a center for centering the four corners of the image file;
D. means for locating the longest straight line on at least one side of the rectangle boundary;
E. means for computation of the skew angle for at least the one side from optimal horizontal or vertical alignment about the center; and
F. means for applying a two-dimensional rotation of the rectangle boundary about the center through the skew angle.

18. A digital image processing apparatus comprising in combination:
A. means for receiving a scaler image file of scaled pixel value;
B. means for segmentation of the scaled pixel values into graphics blocks and non-graphics blocks, the segmentation means including:
1. means for determining at least a first edge threshold from the scaled pixel values wherein the edge threshold is determined according to the following formula:

$$TV=a\times((LNG-DNG)/b+DNG);$$

where:
a and b are numerical coefficients;
TV=edge threshold;
LNG=lightest non-white scalar pixel value; and
DNG=darkest non-black scalar pixel value; and
2. means for applying at least one edge detection filter to each scalar pixel value and tagging as an edge the scalar pixel values satisfying the conditions of the edge detection filter;
C. means for developing a binary image file derived from the scalar image file, the developing means including:
1. means for applying a text threshold to the non-graphics blocks in the scalar image file to convert each scaled pixel non-graphic value into a first binary value representing text or alternatively a second binary value representing background for the text; the applying means includes a vertical edge detection filter and a horizontal edge detection filter with the vertical edge detection filter emphasized in comparison to the horizontal edge detection filter so that the applying means is more likely to locate a vertical edge than a horizontal edge; and
2. means for applying a graphics threshold to graphics blocks in the scalar image file to convert each scaled pixel graphic value into a first binary value representing one color or alternatively a second binary value representing another color; and
D. means for compressing the binary image file to yield a compressed image file for subsequent decompression and digital processing of the compressed image file.

19. The digital image processing apparatus of claim 18 also including means for deskewing the image.

20. The digital image processing apparatus of claim 19 wherein the deskewing means includes:
A. means for tracing the image file to locate a rectangle boundary for the image file;
B. means for computing the widest points of the rectangle boundary;
C. means for determining a center for centering the four corners of the image file;
D. means for locating the longest straight line on at least one side of the rectangle boundary;

E. means for computation of the skew angle for at least the one side from optimal horizontal or vertical alignment about the center; and F. means for applying a two-dimensional rotation of the rectangle boundary about the center through the skew angle.

21. A digital image processing apparatus comprising in combination:

A. means for receiving a scaler image file of scaled pixel value;

B. means for segmentation of the scaled pixel values into graphics blocks and non-graphics blocks, the segmentation means including:
 1. means for determining at least a first edge threshold from the scaled pixel values;
 2. means for applying at least one edge detection filter to each scalar pixel value and tagging as an edge the scalar pixel values satisfying the conditions of the edge detection filter; and
 3. block division and tagging means having:
  (i) means for locating blocks of cells within a predetermined proximity to one another whose contents have been tagged as text;
  (ii) means for analyzing cells in the block and re-tagging them as text or graphics wherein the analyzing means tags the cells in the block according to the following procedure, in which a–g are fractional coefficients:

A. Define NUMCELLS=Number of cells in the block.
B. If:
 1. The number of graphics cells>=NUMCELLS a or:
 2. both (i) the number of the text cells>=NUMCELLS * b, and (ii) the number of white cells=NUMCELLS * c;
 3. Then tag all cells in the bock as containing graphics.
C. If:
 1. the number of text cells>=NUMCELLS * d; or
 2. both (i) the number of text cells>=NUMCELLS * e, and (ii) the number of white cells>=NUMCELLS * f; or
 3. the number of white cells>=NUMCELLS * g;
 4. then tag the cells in the block as text.
D. Otherwise:
 1. subdivide the block into nine different regions.
 2. Starting with the upper-left region, repeat the process of steps A through C above, treating the region as a block of cells in the context of those steps.
 3. For any region that cannot be tagged according to the process of steps A through C above, treating the region as a block in the context of steps D(1) and D(2) above, and repeat this subdividing, testing, and tagging procedure until:
  a. all cells in the block are re-tagged; or
  b. the remaining sub-regions of cells that have not yet been re-tagged consist of ten or fewer cells. In this event, do not change the original tagging for these sub-regions; and
   (iii) means for analyzing cells in the block and re-tagging them as text or graphics; and
   (iv) means for comparing any remaining cells, not previously allocated to blocks, to adjacent cells to re-tag the remaining cells as text or graphics;

C. means for developing a binary image file derived from the scalar image file, the developing means including:
 1. means for applying a text threshold to the non-graphics blocks in the scalar image file to convert each scaled pixel non-graphic value into a first binary value representing text or alternatively a second binary value representing background for the text: the applying means includes a vertical edge detection filter and a horizontal edge detection filter with the vertical edge detection filter emphasized in comparison to the horizontal edge detection filter so that the applying means is more likely to locate a vertical edge than a horizontal edge; and
 2. means for applying a graphics threshold to graphics blocks in the scalar image file to convert each scaled pixel graphic value into a first binary value representing one color or alternatively a second binary value representing another color; and D. means for compressing the binary image file to yield a compressed image file for subsequent decompression and digital processing of the compressed image file.

22. The digital image processing apparatus of claim 21 also including means for deskewing the image.

23. The digital image processing apparatus of claim 22 wherein the deskewing means includes:

A. means for tracing the image file to locate a rectangle boundary for the image file;

B. means for computing the widest points of the rectangle boundary;

C. means for determining a center for centering the four corners of the image file;

D. means for locating the longest straight line on at least one side of the rectangle boundary;

E. means for computation of the skew angle for at least the one side from optimal horizontal or vertical alignment about the center; and F. means for applying a two-dimensional rotation of the rectangle boundary about the center through the skew angle.

24. A digital image processing apparatus comprising in combination:

A. means for receiving a scaler image file of scaled pixel value;

B. means for segmentation of the scaled pixel values into graphics blocks and non-graphics blocks, the segmentation means including:
 1. means for determining at least a first edge threshold from the scaled pixel values;
 2. means for applying at least one edge detection filter to each scalar pixel value and tagging as an edge the scalar pixel values satisfying the conditions of the edge detection filter;
 3. means for grouping adjacent scalar pixel values into a cell and re-tagging the scalar pixel values in the cell as:
  (a) text if the cell contains outer connected edge of adjacent scalar pixel values or an edge of scalar pixel values extending to the boundaries of the cell;
  (b) background if the cell contains a majority of non-edge scalar pixel values; and
  (c) graphics otherwise; and
 3. block division and tagging means having:
  (i) means for locating blocks of cells within a predetermined proximity to one another whose contents have been tagged as text;
  (ii) means for analyzing cells in the block and re-tagging them as text or graphics wherein the analyzing means tags the cells in the block according to the following procedure, in which a–g are fractional coefficients:

A. Define NUMCELLS=Number of cells in the block.
B. If:
  1. The number of graphics cells>=NUMCELLS a or:
  both (i) the number of the text cells>=NUMCELLS * b, and (ii) the number of white cells=NUMCELLS * c;
  3. Then tag all cells in the bock as containing graphics.
C. If:
  1. the number of text cells>=NUMCELLS * d; or
  2. both (i) the number of text cells>=NUMCELLS * e, and (ii) the number of white cells>=NUMCELLS * f; or
  3. the number of white cells>=NUMCELLS * g;
  4. then tag the cells in the block as text.
D. Otherwise:
  1. subdivide the block into nine different regions.
  2. Starting with the upper-left region, repeat the process of steps A through C above, treating the region as a block of cells in the context of those steps.
  3. For any region that cannot be tagged according to the process of steps A through C above, treating the region as a block in the context of steps D(1) and D(2) above, and repeat this subdividing, testing, and tagging procedure until:
    a. all cells in the block are re-tagged; or
    b. the remaining sub-regions of cells that have not yet been re-tagged consist of ten or fewer cells. In this event, do not change the original tagging for these sub-regions; and
      (iii) means for analyzing cells in the block and re-tagging them as text or graphics; and
      (iv) means for comparing any remaining cells, not previously allocated to blocks, to adjacent cells to re-tag the remaining cells as text or graphics;
C. means for developing a binary image file derived from the scalar image file, the developing means including:
  1. means for applying a text threshold to the non-graphics blocks in the scalar image file to convert each scaled pixel non-graphic value into a first binary value representing text or alternatively a second binary value representing background for the text; the applying means includes a vertical edge detection filter and a horizontal edge detection filter with the vertical edge detection filter emphasized in comparison to the horizontal edge detection filter so that the applying means is more likely to locate a vertical edge than a horizontal edge; and
  2. means for applying a graphics threshold to graphics blocks in the scalar image file to convert each scaled pixel graphic value into a first binary value representing one color or alternatively a second binary value representing another color; and
D. means for compressing the binary image file to yield a compressed image file for subsequent decompression and digital processing of the compressed image file.

25. A digital image processing apparatus comprising in combination:
A. means for receiving a scaler image file of scaled pixel value;
B. means for segmentation of the scaled pixel values into graphics blocks and non-graphics blocks;
C. means for developing a binary image file derived from the scalar image file, the developing means including:
  1. means for applying a text threshold to the non-graphics blocks in the scalar image file to convert each scaled pixel non-graphic value into a first binary value representing text or alternatively a second binary value representing background for the text;
  2. means for applying a graphics threshold to graphics blocks in the scalar image file to convert each scaled pixel graphic value into a first binary value representing one color or alternatively a second binary value representing another color; and
  3. means for subdividing the image into regions and for each such region calculating a text threshold or a graphics threshold from the scalar pixel values in the region; wherein the text and graphics thresholds are calculated according to the following formulas:

$$TT = a * (MSV + ((LNG - DNG)/b + DNG)$$

$$GT = (LNG - DNG) * a + DNG + (d * ((USS - LSS)/b + USS))e/f$$

where:
  a, b, c, d, e, and f are numerical coefficients;
  TT=text threshold;
  GT=graphics threshold;
  MSV=median scalar pixel value;
  LNG=lightest non-white scalar pixel value; and
  DNG=darkest non-black scalar pixel value; and
D. means for compressing the binary image file to yield a compressed image file for subsequent decompression and digital processing of the compressed image file.

26. A digital image processing apparatus comprising in combination:
A. means for receiving a scaler image file of scaled pixel values;
B. means for segmentation of the scaled pixel values into graphics blocks and non-graphics blocks;
C. means for developing a binary image file derived from the scalar image file, the developing means including:
  1. means for applying a text threshold to the non-graphics blocks in the scalar image file to convert each scaled pixel non-graphic value into a first binary value representing text or alternatively a second binary value representing background for the text; and
  2. means for applying a graphics threshold to graphics blocks in the scalar image file to convert each scaled pixel graphic value into a first binary value representing one color or alternatively a second binary value representing another color wherein the graphics threshold application means includes:
    (a) means for passing a dither matrix over the graphics blocks to re-assign a background pixel value to all scalar pixel values in the block less than a corresponding dither value in the dither matrix;
    (b) means for passing an error diffuse dither matrix over the graphics blocks to yield error diffuse pixel values;
    (c) comparing the graphics threshold value to the difference between the non-re-assigned scalar pixel values and the corresponding error diffuse pixel values; and
    (d) means for re-setting the scalar pixel value to a first binary number if the difference is greater than the graphics threshold and for otherwise re-setting the scalar pixel value to a second binary number; and
D. means for compressing the binary image file to yield a compressed image file for subsequent decompression and digital processing of the compressed image file.

* * * * *